United States Patent [19]

Abe et al.

[11] Patent Number: 4,520,889

[45] Date of Patent: Jun. 4, 1985

[54] GUIDANCE CONDUCTOR FOR DRIVERLESS VEHICLE

[75] Inventors: Eiji Abe; Junpei Kanazawa, both of Ise, Japan

[73] Assignee: Shinko Electric Co., Ltd., Japan

[21] Appl. No.: 508,418

[22] Filed: Jun. 27, 1983

Related U.S. Application Data

[63] Continuation-in-part of Ser. No. 239,458, Mar. 2, 1981, abandoned.

[51] Int. Cl.³ .............................................. B62D 1/24
[52] U.S. Cl. ...................................... 180/168; 104/88
[58] Field of Search ................. 104/88, 298, 299, 301; 180/131, 167, 168, 169; 191/10; 246/187 B; 318/580, 587

[56] References Cited

U.S. PATENT DOCUMENTS

| | | | |
|---|---|---|---|
| 2,339,291 | 1/1944 | Paulus et al. | 180/131 X |
| 3,029,890 | 4/1962 | Mountjoy | 180/168 |
| 3,038,970 | 6/1962 | Paluka | 191/10 |
| 3,132,710 | 5/1964 | Petrella et al. | 180/168 |
| 3,768,586 | 10/1973 | Thompson et al. | 318/587 |
| 4,006,790 | 2/1977 | Kawano et al. | 180/168 |

Primary Examiner—Robert B. Reeves
Assistant Examiner—David F. Hubbuch
Attorney, Agent, or Firm—Darby & Darby

[57] ABSTRACT

A guidance conductor for a driverless vehicle which is controlled to move along a track way by detecting an induction field. The guidance conductor is a continuous conductor having portions laid parallel in a predetermined spaced relation to each within the track way so as to form substantially a closed circuit, and is energized by a high frequency source. The guidance conductor also has loop portions in which only one portion of the conductor is laid. The driverless vehicle is adapted to detect the induction field generated by the guidance conductor.

1 Claim, 11 Drawing Figures

GUIDANCE CONDUCTOR FOR DRIVERLESS VEHICLE

This is a continuation-in-part of U.S. patent application Ser. No. 239,458 filed Mar. 2, 1981 and now abandoned.

BACKGROUND OF THE INVENTION

1. Field of the Invention

This invention relates to a guidance conductor laid on a track way by which driverless vehicle is controlled to move along the track way by detecting the induction field generated by the single conductor.

2. Description of the Prior Art

A typical arrangement of conventional guidance conductors adapted for use in such a driverless vehicle may be shown in FIG. 1, wherein a track way generally designated by a reference numeral 1 is constructed in any predetermined shape as required for delivering goods from certain loading places to unloading places. The track way 1 is comprised of, in this example for the purpose of illustration, a main way 2 and two branch ways, 3, 3 extending out from the main way 2. There is formed a guidance groove, not shown, generally centrally of the track way 1 so as to locate guidance conductors 4 and 6 within the space defined by the guidance groove. The guidance conductor 4 including a guide path 4a and a lead wire 4b is connected to a high frequency current source 5, the guide path 4a being laid within the guidance groove formed along the main way 2. The guidance conductor 6 including a guide path 6a and a lead wire 6b is also connected to a high frequency current source 7, the guide path 6a being laid within the guidance grooves formed along both the main way 2 and the branch ways 3 and 3. The lead wires 4b and 6b, which are often suspended from a ceiling or supported at a wall, are employed for coupling the guidance paths 4a and 6a to the respective current sources 5 and 7, and the lead wires 4b and 6b do not serve as a guidance means for a driverless vehicle 27 described hereinafter since they are not laid on the track way 1. The high frequency current sources 5 and 7 have different frequencies f1 and f2, respectively with each other, so that the guidance couductors 4 and 5 are energized to allow different high frequency currents to flow independently relative to each other. A driverless vehicle which rides upon the surface of the track way 1 is guided to move along the track way 1 by detecting, with a detector mounted on the vehicle, either the electromagnetic field generated by the guidance conductor 4, or that generated by the guidance conductor 6. When it is required to direct the driverless vehicle to take one of the branch ways 3 and 3 from the main way 2, the detector is controlled to receive only the high frequency f2 which acts on the branch ways 3 and 3. While on the other hand, the change of the direction of the vehicle from the branch ways 3 and 3 to the main way 2 is similarly effected by rendering the receptive condition of the detector responsive to the high frequency f1 instead of the high frequency f2. It is readily understood here from the principle of operation that if one of the lead wires 4b and 4b of the guidance conductor 4 was laid for returning it to the current source 5 by way of the same guidance groove where the guide path 4a is laid, the high frequency induction fields generated by the guide path 4a and the lead wire 4b will interfere with each other thereby resulting in an incorrect guidance for the driverless vehicle. The same interference may also be true in connection with the guidance conductor 6, if one of the lead wires 6b and 6b was laid within the same guidance groove where the guide path 6a is laid. Therefore, it has been a requisite for the lead wires 4b and 6b to be returned to the respective high frequency current sources 5 and 7 by way of different courses from the guidance grooves formed in the track way 1, such as for example by routing it via the ceiling above the track way 1 or the nearby wall where it is not susceptible to electromagnetic interference. This necessarily leads to a complicate laying work of the lead wires of the guidance conductor and, in addition, leads to an expensive cost of materials and construction work. In the case of track ways where a plurality of branch ways are employed, the above disadvantages accompanied by the conventional guidance conductors have been extensively enhanced. Moreover, it has also been a problem in that so many high frequency current sources are required to be implemented in proportion with the number of branch ways.

SUMMARY OF THE INVENTION

It is, therefore, a principal object of the present invention to provide an improved guidance conductor for a driverless vehicle in which a conventional lead wire of the conductor can be laid on the same track way as that of the guide path.

It is a further object of the invention to provide a guidance conductor which is capable of being laid with a relatively low cost and with ease.

It is a still further object of the invention to provide a guidance conductor which requires only a single high frequency current source for driving it to generate an induction field.

According to the present invention, there is provided a guidance conductor which comprises a continuous conductor being so laid that two parts of the conductor are arranged parallel to each other in a predetermined spaced relation within a track way and that when the track way comprises a main way and a branch way, the two parallel parts of the conductor are branched at a branch point to follow the respective main and branch way, and is energized by means for electrically energizing the closed circuit so as to allow a high frequency current to flow in the guidance conductor. Moreover, a driverless vehicle employed for being controlled to move along the track way is provided with means for detecting the induction field generated by the guidance conductor. As a result, the guidance conductor of this invention may be made possible to lay the whole length thereof on the same track way upon which the driverless vehicle rides. This dispenses with the complicated laying work of the lead wire heretofore encountered in the conventional guidance conductor, thereby resulting in a relatively low cost of materials and construction work.

The foregoing and other objects, features and advantages of the invention will be apparent from the following, more detailed, description of preferred embodiments taken in conjunction with the accompanying drawings, in which:

DETAILED DESCRIPTION

Figure 1:
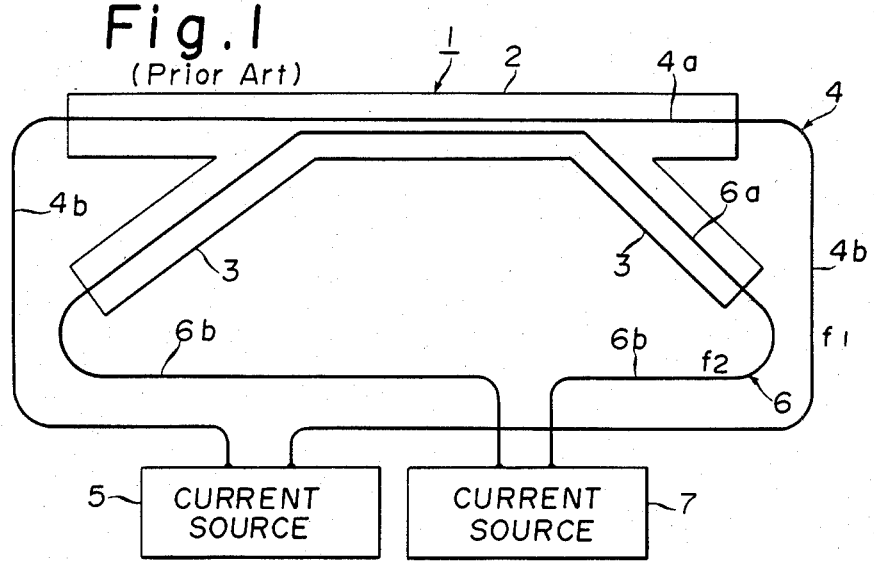
FIG. 1 is a schematic diagram of guidance conductors laid on a track way for a driverless vehicle according to the prior art.
Figure 2:
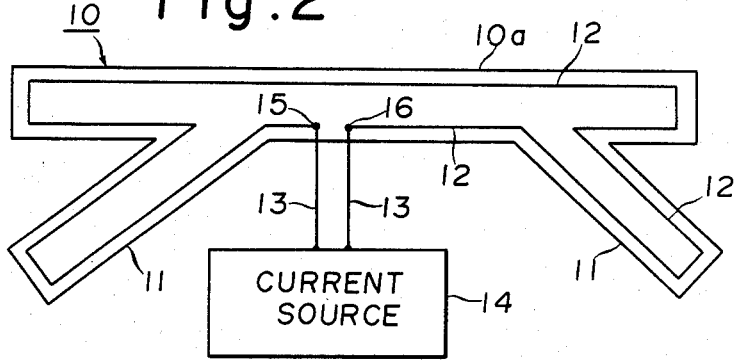
FIG. 2 is a diagrammatic view showing a first embodiment of a guidance conductor according to the present invention which is laid on a track way having two branch ways.
Figure 5:
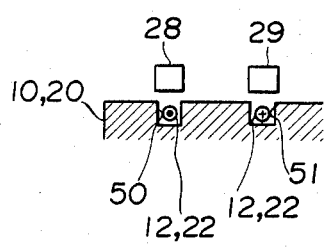
FIG. 5 is a cross sectional view of a track way illustrating a relationship between a guidance conductor and detectors.

Referring to FIG. 2, there is shown a diagrammatic view of a first embodiment, wherein reference numeral 10 generally designates a track way. The track way 10 is in this example constructed as having one main way 10a and two branch ways 11 and 11. A guidance conductor 12 is comprised of a single continuous conductor two parts of which are laid parallel in a predetermined spaced relation to each other within the track way 10. The space between the two parallel going conductors 12 is predetermined in accordance with the width between two guidance grooves 50 and 51, as shown in FIG. 5. The guidance grooves 50 and 51 are formed in the track way 10 for accommodating the guidance conductor 12 within the space defined by the grooves 50 and 51. Thus, the guidance conductor 12 is laid throughout the track way 10 to form substantially a closed circuit which is terminated at feeding terminals 15 and 16. At both the feeding terminals 15 and 16, a high frequency current is supplied from a high frequency current source 14 via intermediate conductors 13 and 13.

It is to be appreciated that the whole guidance conductor 12 is laid within the track way 10 without using other different courses. In addition, the intermediate conductors 13 may be made as short as possible since the feeding terminals 15 and 16 can be formed at any desired point within the closed circuit, i.e., the nearest point to the current source 14. Therefore, the problem as to the relatively lengthy lead wire of the conductor which has been accompanied by the conventional guidance conductor has been fully eliminated.

Figure 3:
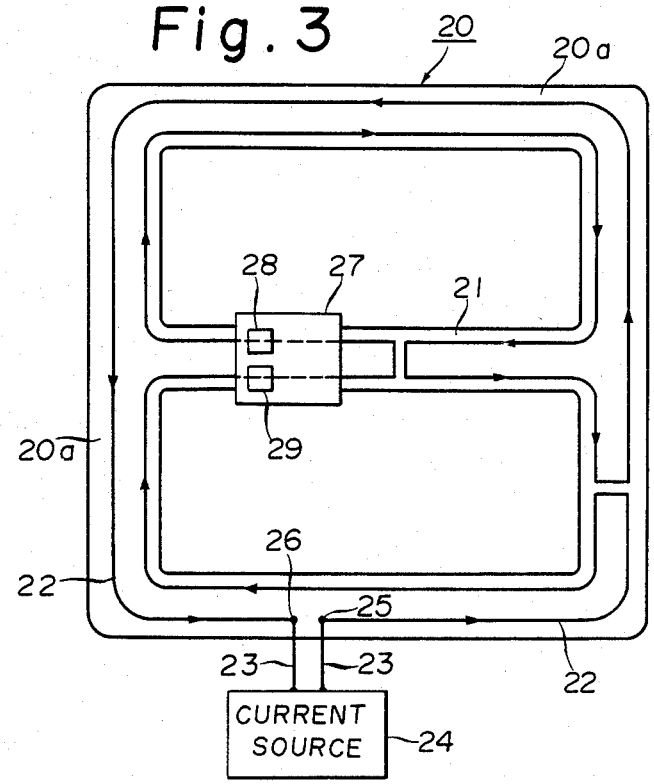
FIG. 3 is a diagrammatic view showing a second embodiment of a guidance conductor according to the present invention which is laid on a track way having a branch way bridging the main way.

Referring now to FIG. 3, there is shown a second embodiment of a guidance conductor according to the present invention wherein a track way 20 is comprised of a main way 20a being substantially of a rectangular shape and a branch way 21 bridging the side sections of the main way 20a at the vicinity of its center. A guidance conductor 22 is comprised of a single continuous conductor two parts of which are laid parallel in a predetermined spaced relation to each other within the track way 20 and are separated at a branch point to follow the main way 20a and branch 21 respectively, or two parts of the main way 20a. The space is similarly determined as described in the first embodiment, so that the description thereof is omitted for the purpose of brevity.

The guidance conductor 22 is laid through the track way 20 to form substantially a closed circuit which is terminated at feeding terminals 25 and 26. A high frequency current is supplied from a high frequency current source 24 via intermediate conductors 23 and 23 to the feeding terminals 25 and 26. As a result, an electromagnetic field is produced around the guidance conductor 22, and hence a driverless vehicle 27 which rides on the track way 20 is controlled to move along the track way 20 by detecting the electromagnetic field.

Figure 4:
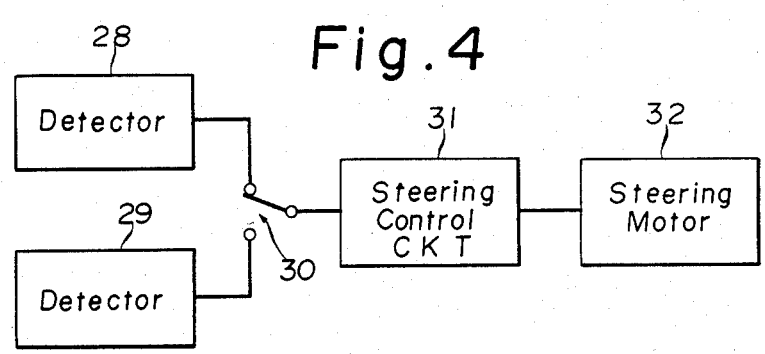
FIG. 4 is a block diagram showing a control circuit of a detector mounted on a driverless vehicle.

The driverless vehicle 27 is provided with a pair of detectors 28 and 29 so that when one of the detectors 28 and 29 is selected, the vehicle 27 is controlled to move along the corresponding track way 20 on either main or branch way 20a or 21, and the associated electric circuit for delivering a steering control signal in response to the output of the detectors 28 and 29. The detectors 28 and 29 are mounted on the vehicle 27 at a suitable position such that they locate just above the guidance grooves 50 and 51 when the vehicle 27 is ridden correctly on the track way 20, as shown in both FIGS. 3 and 5. The associated circuits with the detectors 28 and 29 are illustrated in FIG. 4, in which the detectors 28 and 29 are selectively connected to a steering control circuit 31 via a selection circuit 30, the selection circuit 30 being switched upon reception of a turning control signal which is supplied either from a programmed control device mounted on the vehicle 27 itself or a certain central control remote from the vehicle 27. The steering control signal is then supplied to a steering motor 32. Thus, when it is required to change the direction of the driverless vehicle 27 from one of the main ways 10a, 20a to one of the branch ways 11, 21, or vice versa, the turning control signal is supplied so as to select a suitable one among the detectors 28 and 29, so that the selected detector may then detect the particular portion of the guidance conductor 12, 22 which is laid on the way the vehicle is to be directed.

Figure 8:
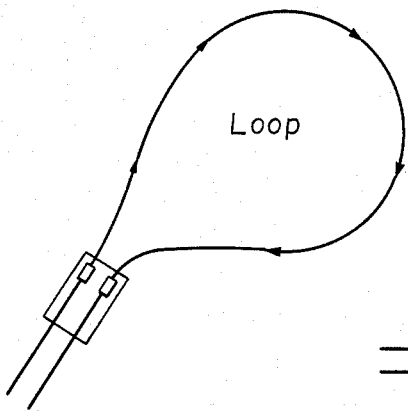
FIGS. 8 and 9 are diagrammatic view showing loop shaped guidance conductors.
Figure 9:
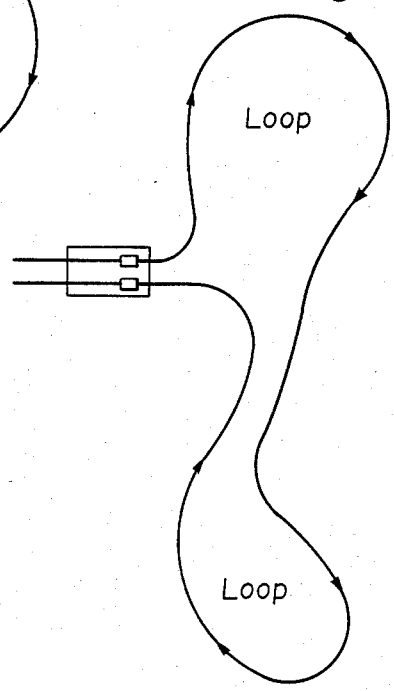

It is to be noted here that a pair of detectors 28 and 29 are provided on the vehicle 27 so as to selectively detect one of the induction field generated by the guidance conductor 12 or 22, that is, to detect either one of the guidance conductors which is laid in parallel with a predetermined spaced relation within the track way 10 or 20. Thus, as shown in FIGS. 8 and 9 it is readily understood by those skilled in the art that when a track way includes a loop shaped portion, it is possible to lay a guidance conductor such that, from the start of the loop shaped portion to its end only a single conductor wire of the guidance conductor is required to be laid, without laying the guidance conductor in parallel with the other guidance conductor as in the main track way. In order to realize the above conception and to reduce conductor length compared with that of FIG. 3, improved embodiments of a guidance conductor are shown in FIGS. 10 and 11.

Figure 10:
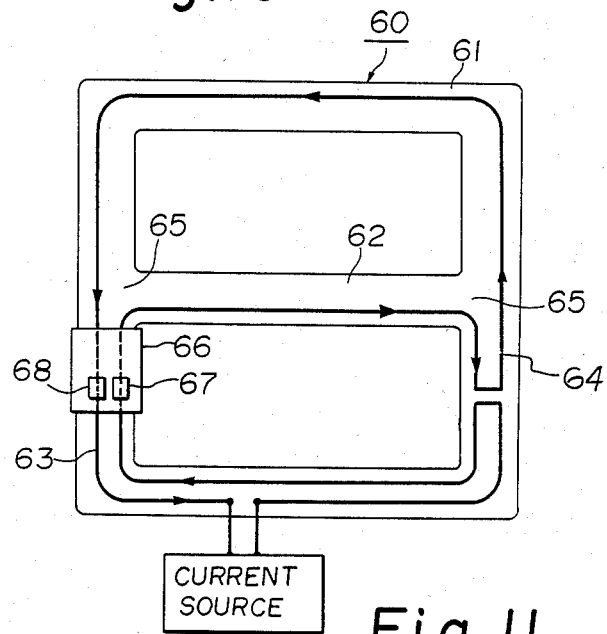
FIGS. 10 and 11 are diagrammatic views showing third and fourth embodiments of a guidance conductor according to the present invention.

Referring to FIG. 10, a track way 60 is comprised of a rectangular-shaped main way 61 and a generally branch way 62 bridging the main way 61. A guidance conductor is so laid within a groove (see FIG. 5) provided on a track way 60 that large and small loop shaped conductor portions 63 and 64 are provided as shown. Before or behind branch points 65, appropriate portions of the guidance conductors are arranged in parallel relation so as to allow the driverless vehicle 66 to follow the main or branch way. The distance between the two parallel conductor portions thus is idential to that of detectors 67 and 68 below the vehicle 66.

Figure 11:
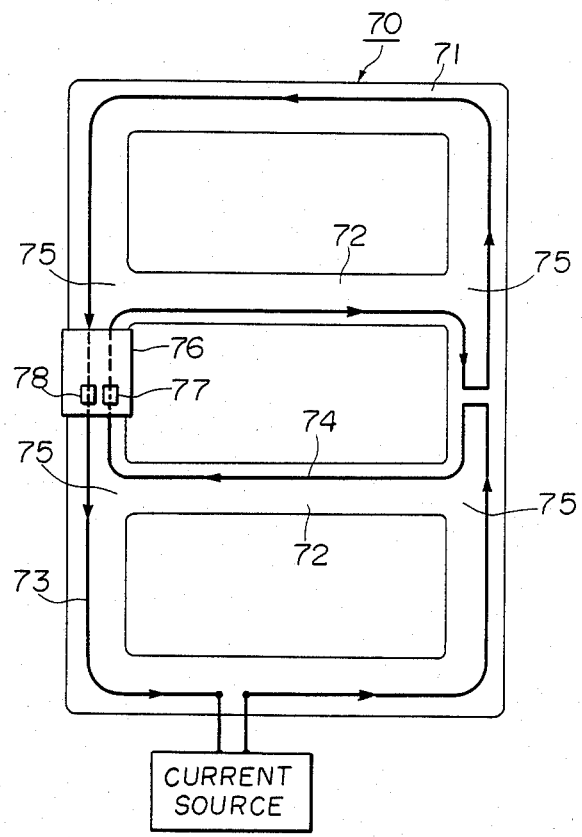

FIG. 11 shows a further embodiment of a guidance conductor according to the present invention. In FIG. 11, a track way 70 includes a generally rectangular-shaped main way 71 and two branch ways 72 each bridging appropriate portions of the main way 71. A guidance conductor is laid within a groove (see FIG. 5) on track 70 so that large and small loop shaped conductor portions 73 and 74 are provided on the main way 71 and branch ways 72, respectively. Before or behind branch points 75, appropriate portions of the guidance conductor are arranged in parallel relation so as to allow the driverless vehicle 76 to follow the main or branch way. The distance between the two parallel conductor portions thus is identical with that of detectors 77 and 78 below the vehicle.

Figure 6:
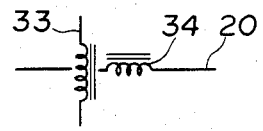
FIGS. 6 and 7 show respectively a plan view and an elevational view of detector coils implemented in a detector.
Figure 7:
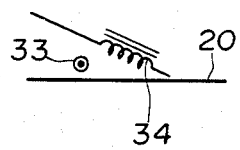

As shown in FIGS. 6 and 7, each of detectors 28 and 29 is preferably comprised of two detection coils 33 and 34, the detection coil 33 being so disposed that its longitudinal axis is arranged in parallel relation to the plane of the track way 20 and perpendicular to the guidance conductor 12 or 22, while the detection coil 34 is disposed so that its axis is arranged in parallel relation to the direction of the guidance conductor 12 or 22 and has a predetermined inclined angle relative to the plane of the track way 20.

This inclination of the coil 34 with respect to the plane of the track way 20 makes it possible that the coil 34 detects the induction field produced by the conductor 12 or 22 not only when the coil 34 is disposed from the conductor 12 or 22 within the vehicle 27 being inclined with respect to the conductor 12 or 22, but also when the coil 34 deviates from the conductor 12 or 22 with the vehicle 27 displaced laterally from the conductor 12 or 22.

In other words, the induction field can be detected by the coil 34 even when the coil is displaced from the conductor 12 or 22 with its longitudinal axis being disposed both in parallel and inclined relation to the conductor 12 or 22 as viewed in a direction perpendicular to the track way 20.

These detectors 28 and 29 are selectively connected by switching means 30 to steering control circuit 31 so as to make the vehicle 27 to move along the track way on either path 20a or 21.

With this arrangement, the coil 34 produces an induced voltage of a certain phase when the vehicle 27 is either inclined with respect to the conductor 12 or 22 in a right-hand direction or displaced laterally from the conductor 12 or 22 in a right-hand direction. Also, the coil 34 produces an induced voltage of a phase reverse to the above mentioned phase when the vehicle 27 is either inclined with respect to the conductor 12 or 22 in a right-hand direction or displaced laterally from the conductor 12 or 22 in left-hand direction. On the other hand, the coil 33 always produces an induced voltage of a certain phase regardless of the conductor 12 or 22, although the amplitude of the induced voltage varies in dependence on the deviation. Therefor, the direction of the deviation of the vehicle 27 from the conductor 12 or 22 can be detected by determining the phase difference between the two induced voltages detected by the coils 33 and 34.

From the above two embodiments it is to be noted that the guidance conductors 12 and 22 may be made possible to lay the whole length thereof on the same track way upon which the driverless vehicle 27 rides.

As is clearly described as shown, the guidance conductor according to the invention may be made to lay the whole length thereof on the same track way upon which the driverless vehicle rides, so that a complicate laying work accompanied by the conventional one is dispenced with, resulting in a relatively low cost of materials and construction work.

While there have been shown and described some preferred embodiments of the present invention, it is to be understand that the invention is not limited thereto but may be variously modified and practiced within the scope set forth in the attached claims.

What is claimed is:

1. A control system for a driverless vehicle which is guided along a track way by detecting an induction field comprising:

a guidance conductor arranged substantially throughout and within said track way to form a closed circuit, said track way including a main portion wherein portions of said guidance conductor are arranged in parallel with each other in a predetermined spaced relationship and a loop portion wherein only one portion of said conductor is laid;

energizing means connected to said guidance conductor for feeding a high frequency current to generate said induction field around said guidance conductor;

a pair of detectors, each said detector being disposed respectively on a side of said driverless vehicle corresponding to a respective edge of said track way, said detectors being arranged to have said predetermined space therebetween for selectively detecting the induction field generated by the conductor portion, if any, laid along the corresponding edge of the track way; and selection circuit means for selecting one of said conductor portions in accordance with a selected route of said track way along which said vehicle is guided;

wherein each said detector comprises a first detection coil disposed parallel to the plane of said track way and perpendicular to said guidance conductor; and a second detection coil disposed substantially in a vertical plane including said guidance conductor and inclined to the horizontal plane of said track way.

* * * * *